United States Patent Office 3,504,718
Patented Apr. 7, 1970

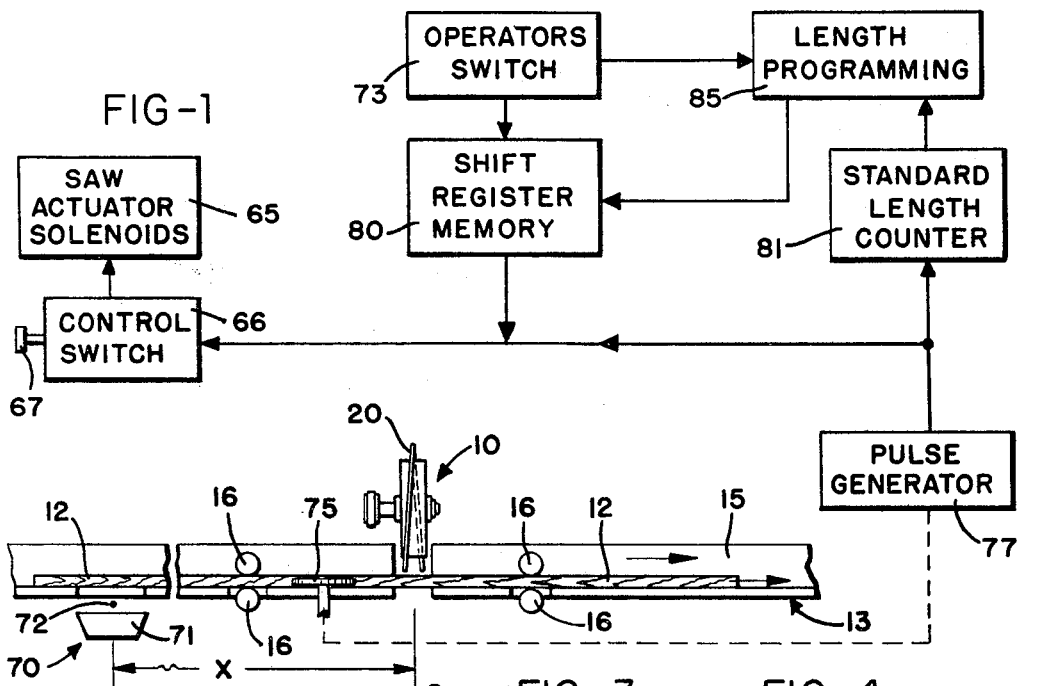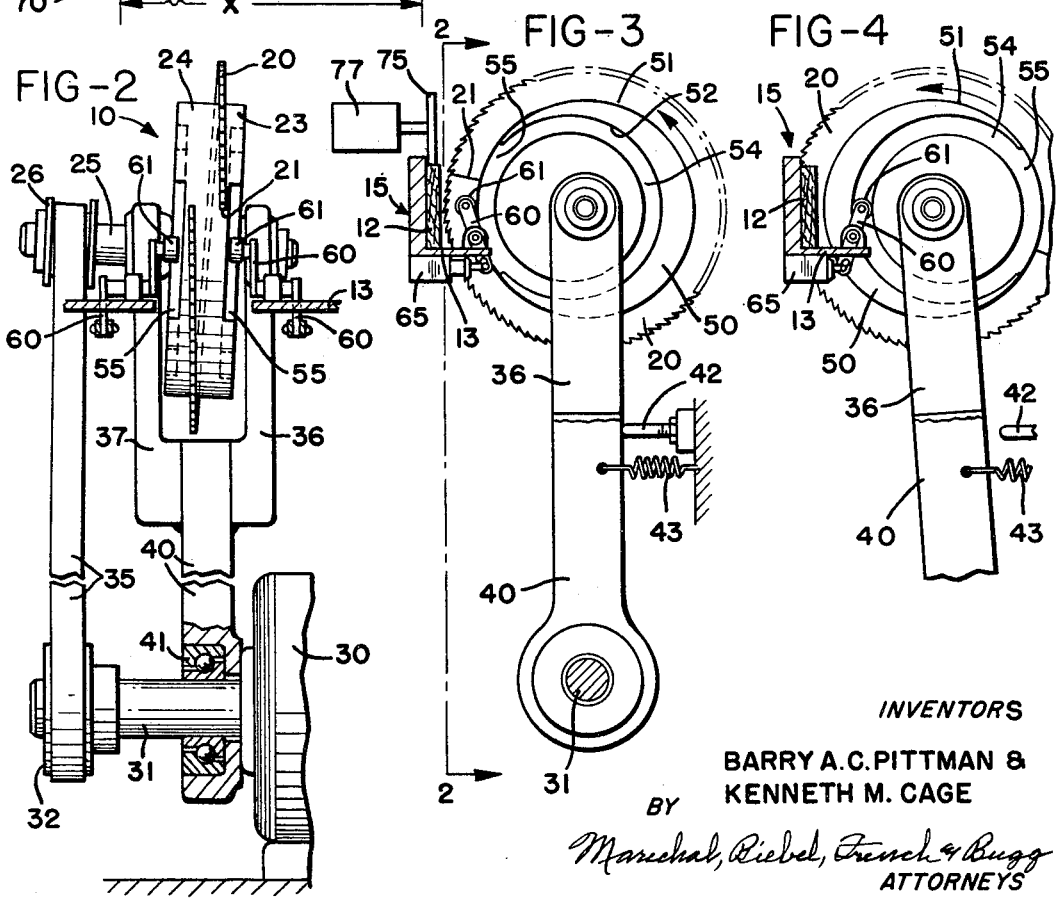

---

3,504,718
APPARATUS FOR CUTTING A CONTINUOUSLY MOVING STRIP OF MATERIAL
Barry A. C. Pittman, Everett, and Kenneth M. Cage, Marysville, Wash., assignors to The Black Clawson Company, Hamilton, Ohio, a corporation of Ohio
Filed Apr. 8, 1968, Ser. No. 719,454
Int. Cl. B26d 5/38
U.S. Cl. 143—46                                2 Claims

---

ABSTRACT OF THE DISCLOSURE

A saw for making a cut perpendicular to the direction of movement of a continuously moving strip of material is formed from a discontinuous helical blade having a cutting edge on its circumference. The speed of rotation of the blade and the pitch angle of the helix are correlated with the longitudinal speed of the strip of material so that the cutting edge of the blade does not move longitudinally relative to the material and thus is able to effect a square cut in the material. The discontinuity in the blade is prevented from engaging the material by mechanical means associated with the actuator which moves the saw into cutting relation with the material.

RELATED APPLICATION

Reference is hereby made to copending United States application Ser. No. 4,785, filed on even date herewith, entitled Apparatus for Cutting a Continuously Moving Strip of Material, and assigned to the same assignee as the present invention.

BRIEF DESCRIPTION OF THE INVENTION

This invention relates to a device for making square cuts in lumber or other strip material such as plastic, millwork and the like, in order to remove defects from the material and to cut it into a selected one of several available predetermined standard lengths while the strip of material is being moved continuously past the device without stopping the material during the cutting operation. By allowing the material to move continuously, even during the time the material is being cut, increased speeds of operation are obtained.

In the preferred embodiment of this invention, an operator may observe a defect approaching the saw, and when the defect passes an observation point a predetermined distance upstream from the saw, he momentarily actuates a switch to initiate the cutting cycle. When the defect then reaches the saw, the saw is moved into the material and the cut is made. Electronic means may also be included to cut the material into standard lengths by measuring the length of the material passing the saw and providing a cutting signal after a predetermined length of material has passed since the last cut was made, independently of whether it was manually or automatically caused.

A saw having a helical blade is employed to make a square cut in the continuously moving strip of material. The helical blade may be formed from a discontinuous circular saw blade mounted to rotate about an axis with the speed of rotation and the pitch angle of the blade correlated with the speed of longitudinal movement of the strip of material so that the cutting portion of the blade does not move longitudinally relative to the continuously moving strip of material and thereby cuts the material perpendicularly to its direction of travel.

Since the helical blade is discontinuous, the discontinuity in the blade must be kept from engaging the strip of material as this would tend to break the saw or to start a cut at a location different from the one selected by the operator or by the standard length circuit. Mechanical means are employed to cause the helical blade to move into the strip of material and return to its starting position in less than one revolution of the blade using only the continuous portion of the blade for cutting purposes.

In the preferred embodiment of this invention, the saw has mounted thereon a cam having a circular outer surface concentric with the axis of the saw and an eccentrically mounted circular inner surface. A cam follower is movable from a first position where it follows the outer cam surface to a second position where it follows the inner cam surface and thus moves the blade into cutting engagement with the material and then returns the blade to its starting position. Since the cam surface is fixed with relation to the discontinuity in the blade, the cam follower may engage the inner cam surface only after the discontinuity is clear of the material and move the saw into cutting relation with the material only during that period of revolution when a continuous portion of the cutting surface of the blade would engage the material.

Accordingly, the principal object of this invention is to provide a saw for cutting a continuously moving strip of material perpendicularly to its direction of movement, which incorporates a helical blade wherein the speed of rotation of the blade and the pitch angle of the helix are correlated with the longitudinal speed of the material, and to provide a helical blade wherein only the continuous cutting edge of the blade cuts the material while the discontinuity in the saw is protected by mechanical means synchroninzing the movement of the saw into the material with the discontinuity in the blade so that the saw is moved into and through the material and is returned to a location clear of the material within one revolution of the blade.

BRIEF DESCRIPTION OF THE DRAWINGS

FIG. 1 is a plan view of a helical saw mounted for relative movement into a continuously moving strip of material with the electronic circuitry used to control the saw shown in block diagram form;

FIG. 2 is a side view of the helical saw showing the support and drive mechanism partly in cross section;

FIG. 3 is a front elevational view of the preferred embodiment of a helical saw mounted for movement into a continuously moving strip of material and showing a circular cam having an inner surface mounted eccentrically on the axis of the saw and an actuating mechanism movable to engage the inner cam surface to force the saw into cutting engagement with the strip of material and to return the saw to its starting position in less than one revolution of the blade; and FIG. 4 shows the embodiment of the saw of FIG. 4 in cutting engagement with the strip of material.

DESCRIPTION OF THE PREFERRED EMBODIMENT

The helical saw shown generally at 10 in FIG. 1 is mounted to cut the strip of material 12, such as lumber, plastic, millwork and the like, perpendicularly to its direction of movement while the material is continuously moving longitudinally along the base 13 relative to the saw from left to right in FIG. 1. The material 12 is supported on a conveyor 15 and is prevented from moving laterally by four rollers 16. The details of the conveyor mechanism for moving the material 12 continuously are not shown since the conveyor mechanism is of conventional design and forms no part of the present invention.

The helical saw 10 may be formed from a conventional circular saw blade 20, as shown in FIGS. 2 and 3, by cutting the blade at 21 from the outer circumferential edge to the center hole, and then mounting the blade between a pair of hub plates 23 and 24 to form the blade 20 in a helical configuration. Other means may be used to form the helical blade, keeping in mind that the pitch angle of the helix is correlated with the speed of rotation of the blade and the longitudinal speed of the material 12.

The helical blade 20 is mounted on a shaft 25 which has attached thereto a pulley 26 driven by an electric motor 30 or other suitable driving means mounted on the base 13 and having an output shaft 31, on which is attached another pulley 32 connected by a belt 35 with the pulley 26. The shaft 25 is journalled in a bearing assembly including a pair of plates 36 and 37 extending upwardly from an arm 40 pivotally supported on the motor shaft 31 by a bearing 41 and resiliently held in a neutral or starting position against a stop 42 by a spring 43. This construction permits the saw to be driven continuously as it moves from its starting position as shown in FIG. 3 into and through the material. The shaft 25 is inclined in a plane parallel to the material 12 at an angle equal to the pitch angle of the helical blade so that a cut substantially perpendicular to the direction of travel of the material will be made as the blade is moved into cutting relationship to the strip of material.

The speed of rotation of the saw 10 is correlated with the pitch angle of the helical blade and the longitudinal speed of the strip of material 12. For a 100-foot per minute longitudinal speed of the strip of material 12 and a blade having a 20-inch diameter and a lead of one inch, a 1200 r.p.m. saw speed will match the rate of advancement of the material so that the cutting edge of the blade does not move longitudinally relative to the material being cut. The tangential velocity or speed of the outer circumference of the saw in the preferred embodiment is limited to a speed in the order of from 6000 to 10,000 feet per minute, regardless of the diameter of the saw being used.

In order to prevent the saw 10 from advancing into the work during an interval in which the discontinuity 21 in the blade would engage the material, mechanical means are provided for controlling the movement of the arm 40 in accordance with the angular position of the discontinuity 21. Mounted for rotation with and on each side of the blade hub are cams 50 of generally C-shape, each having an outer circular surface 51 concentric with the shaft 25 and a circular inner cam surface 52 eccentrically located with respect to the axis of shaft 25. The cam 50 includes an inner circular cam surface forming a track 54 concentric with surface 52. The track 54 has an opening 55 aligned with the discontinuity 21 in the blade 20.

A pair of cam followers or actuating arms 60, each carrying a roller 61 at its outer end, are pivotally mounted on the base 13. The cam followers are movable to one of two positions, as shown in FIGS. 3 and 4, by means such as solenoid 65 which may be controlled by suitable control switch means 66, shown as having an actuating button 67. The elements 65 may also represent fluid pressure cylinders in which case the switch means 66 would represent a control valve.

In operation, when the solenoids 65 are energized, the actuating arms 60 are urged against the outer surfaces 51, and rollers 61 follow these surfaces until the opening 55 in each cam 50, aligned with the discontinuity 21 in the helical blade, reaches the rollers 61. At that time, the arms 60 are moved to a position shown in FIG. 4, and the rollers 61 follow the tracks 54. As the blade continues to rotate, the tracks 54 will coact with the rollers 61, and since the tracks 54 are eccentrically located with respect to the axis of the blade, the saw will be forced against spring 43 into the material 12 to cut it completely, and then returned to its starting position within one revolution. The solenoids 65 are deenergized before this occurs, and the actuator arms 60 are then returned to their original position when the gap 55 again reaches the rollers 61, which release the saw for retraction by spring 43.

It will be apparent that the actuator arms 60 could be operated mechanically, and that the solenoid switch means 66 could be manually operated. More accurate control is provided, particularly when the saw is used for cutting out defective portions of the material 12, if the switch means 66 is provided with a delay mechanism, and if the operator locates each such defect by referring to a shadow line device 70 comprising a source of light 71 and a wire 72 positioned vertically between the light and the material 12. The wire 72 thus casts a precisely defined shadow on the material at a predetermined distance and upstream from the saw 10. When a defect passes the shadow line, the operator actuates a switch button 73 to place in operation the delay mechanism which will cause the saw to cut the material 12 when the defect subsequently moves into the proper position with relation to the saw, as now described.

In operation with the shadow line device 70, the movement of the material 12 with relation to the saw 10 is preferably monitored by a length sensor, comprising a measuring wheel 75 engaging the edge of the material 12 and a pulse generating device 77, which form a length sensing means providing electrical pulses representing small but equal lengths of material passing under the measuring wheel 75. These length pulses are applied as input signals to a delay means or shift register memory 80 and a standard length counter 81. The shift register memory 80 permits the operator to actuate the switch 73 to produce a cutting command signal to begin the cutting operation when he observes a defect at the shadow line or any other predetermined location upstream from the saw, and it may be adjusted to compensate for the operator's reaction time or the time between the observation of the defect passing the shadow line and the time he actually actuates the switch 73.

The saw 10 may also be provided with means enabling it to cut the material automatically into predetermined standard lengths. The length programming circuit 85 selects one of a number of predetermined standard length signals supplied by the standard length counter 81 and applies that signal to the memory 80. A reset signal is applied to the standard length counter 81 each time a cut is made, whether by the operator or through the operation of the standard length counter. Reference is made to copending application Ser. No. 522,940, filed May 25, 1966, and assigned to the same assignee, for a description of a shadow line device and electronic circuitry which provides for the delay between the manual actuation of the switch by the operator and the application of a cutting signal to the saw, and which may be employed to provide cutting signals at predetermined standard lengths which may be employed in practicing the present invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for cutting a longitudinally moving strip of material perpendicularly to its direction of movement without stopping the material during the cutting operation, comprising a stationary base defining the path of movement of the material, a saw including a discontinuous helical blade extending substantially completely around an axis and having a cutting portion on its outer circumferential edge, means for rotating said blade about said axis with the speed of rotation and the pitch angle of said blade correlated with the speed of longitudinal movement of said strip of material so that said cutting portion has substantially no movement longitudinally of the strip of material, means mounting said saw on said base for movement normally of said path of the material, actuating means for moving said blade into and through the material and for returning it to a position clear of the material in less than one revolution of the blade, said actuating means including a cam surface mounted to move within said blade and a cam follower having a mounting fixed on said base being movable on said mounting between a first position clear of said cam surface and a second position wherein said cam surface engages said cam follower to move said blade into the moving strip of material to cut the material and to return said blade to its starting position in less than one revolution, said actuating means being so oriented that said blade is moved into cutting engagement with the strip of material only when said continuous cutting edge of said blade will engage the material, and control means for effecting movement of said cam follower between said positions thereof.

2. The apparatus set forth in claim 1 wherein said actuating means includes a generally C-shaped cam surface mounted on said blade eccentrically of the axis thereof and having an open portion substantially radially aligned within the discontinuous portion of said blade.

References Cited

UNITED STATES PATENTS

| 2,277,942 | 3/1942 | Anderson | 83—340 X |
| 2,717,639 | 9/1955 | James | 83—672 X |
| 2,767,459 | 10/1956 | Holman et al. | |
| 3,286,569 | 11/1966 | Hancock et al. | 83—340 X |

DONALD R. SCHRAN, Primary Examiner

U.S. Cl. X.R.

83—340, 672; 143—47